(12) United States Patent
Chieco (10) Patent No.: US 12,181,733 B2
(45) Date of Patent: Dec. 31, 2024

(54) SYSTEM AND METHOD FOR VIRTUAL FITTING OF EYEGLASSES

(71) Applicant: Christopher Chieco, Brooklyn, NY (US)

(72) Inventor: Christopher Chieco, Brooklyn, NY (US)

(*) Notice: Subject to any disclaimer, the term of this patent is extended or adjusted under 35 U.S.C. 154(b) by 284 days.

(21) Appl. No.: 17/103,332

(22) Filed: Nov. 24, 2020

(65) Prior Publication Data

US 2022/0163822 A1 May 26, 2022

(51) Int. Cl.
*G02C 13/00* (2006.01)
*G02C 7/02* (2006.01)
*G06T 19/20* (2011.01)

(52) U.S. Cl.
CPC ............ *G02C 13/003* (2013.01); *G02C 7/027* (2013.01); *G06T 19/20* (2013.01)

(58) Field of Classification Search
CPC ................. G02C 13/003; A61B 3/11–3/112
USPC ............................................. 351/159.73, 178
See application file for complete search history.

(56) References Cited

U.S. PATENT DOCUMENTS

| | | | |
|---|---|---|---|
| 4,944,585 A * | 7/1990 | Mizuno | A61B 3/111 351/204 |
| 6,692,127 B2 | 2/2004 | Abitbol et al. | |
| 8,733,936 B1 | 5/2014 | Kornilov et al. | |
| 10,048,516 B2 * | 8/2018 | Liang | G02C 13/00 |
| 10,386,657 B2 * | 8/2019 | El-Hajal | A61B 3/0025 |
| 10,620,454 B2 * | 4/2020 | El-Hajal | G02C 13/005 |
| 11,366,343 B2 * | 6/2022 | Varady | G06V 10/44 |
| 2005/0162419 A1 * | 7/2005 | Kim | G06T 15/00 382/199 |
| 2015/0055086 A1 * | 2/2015 | Fonte | G02C 13/005 700/98 |
| 2018/0164610 A1 * | 6/2018 | Liang | H04N 13/204 |
| 2018/0321517 A1 * | 11/2018 | El-Hajal | A61B 3/111 |
| 2019/0196221 A1 * | 6/2019 | El-Hajal | G02C 7/027 |
| 2020/0103675 A1 | 4/2020 | Schwarz et al. | |
| 2020/0142224 A1 | 5/2020 | Schwarz et al. | |
| 2021/0088811 A1 * | 3/2021 | Varady | G02C 13/005 |

OTHER PUBLICATIONS

Parker, Warby. "How to Adjust Your Glasses at Home | Warby Parker." YouTube, YouTube, May 29, 2020, www.youtube.com/watch?v=Qn9vtZfEEwc. (Year: 2020).*

Meister, Darryl, and James E Sheedy. Introduction to Ophthalmic Optics. Carl Zeiss Vision, 2008. (Year: 2008).*

* cited by examiner

*Primary Examiner* — Zachary W Wilkes
(74) *Attorney, Agent, or Firm* — CANTOR COLBURN LLP (57) ABSTRACT

A system performs a method for fitting glasses to a person. The system includes an imaging device and a processor. The imaging device obtains an image of the person while wearing an unfitted frame. The processor determines a dimension of the person from the image and determines a dimension for a fitted frame that provides a selected lens-pupil distance for the lens based on the dimension of the person and the specifications of the lens. The unfitted glasses frame is adjusted to obtain the dimensions of the fitted frame.

17 Claims, 9 Drawing Sheets

SYSTEM AND METHOD FOR VIRTUAL FITTING OF EYEGLASSES

INTRODUCTION

The subject disclosure relates to proper eyewear fitting and specifically to a system and method for fitting eyeglasses based on relevant measurements obtained from an image of an individual wearing unfitted eyeglasses.

When purchasing eyewear, an individual or client generally obtains a lens prescription from an ophthalmologist and selects a desired frame from a plurality of frames in the ophthalmologist's office. The lens and frame are then sent to a laboratory or workshop in which general dimensions are used to fit the lens to the frame. Finally, the frames are fitted to the client during a second visit to the office. This process can be inconvenient for the client. Accordingly, it is desirable to provide a system and method for providing a proper fitting to the client without extended wait times.

SUMMARY

In one exemplary embodiment, a method of fitting glasses to a person is disclosed. An image is obtained at an imaging device of the person while wearing an unfitted frame. A dimension of the person is determined from the image. A dimension for a fitted frame that provides a selected lens-pupil distance for the lens is determined based on the dimension of the person and the specifications of the lens. The unfitted glasses frame are adjusted to the dimensions of the fitted frame.

In addition to one or more of the features described herein, the imaging device further includes one of a handheld device, a smartphone, a Lidar imaging device, a digital camera; and a web camera. The method further includes mapping the image to a pixelated grid and determining the dimensions at the grid. The method further includes determining a conversion factor between pixel dimensions and physical dimensions using a frame width in pixel dimensions and a known frame width of the frame. The method further includes determining an interpupillary distance of the person based on a correction for back vertex distance. The image is at least one of a head-on image and a side image of the head. The method further includes adjusting the dimensions of the frame to obtain at least one of a selected interpupillary distance of the left and right lenses, a selected back vertex distance, and a location of a seg drop. Adjusting the frame further includes adjusting at least one of a temple bend and a temple bend position.

In another exemplary embodiment, a system for fitting glasses to a person is disclosed. The system includes an imaging device and a processor. The imaging device obtains an image of the person while wearing an unfitted frame. The processor is configured to determine a dimension of the person from the image, and determine a dimension for a fitted frame that provides a selected lens-pupil distance for the lens based on the dimension of the person and the specifications of the lens, wherein the unfitted glasses frame is adjusted to the dimensions of the fitted frame.

In addition to one or more of the features described herein, the imaging device further includes one of a handheld device, a smartphone, a Lidar imaging device, a digital camera, and a web camera. The processor is further configured to map the image to a pixelated grid and determine the dimensions at the grid. The processor is further configured to determine a conversion factor between pixel dimensions and physical dimensions using a frame width in pixel dimensions and a known frame width of the frame. The processor is further configured to determine an interpupillary distance of the person based on a correction for back vertex distance. The image is at least one of a head-on image and a side image of the head. The unfitted frame is adjusted by to obtain at least one of a selected interpupillary distance of the left and right lenses, a selected back vertex distance, and a location of a seg drop. The unfitted frame is adjusted by adjusting at least one of a temple bend and a temple bend position.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
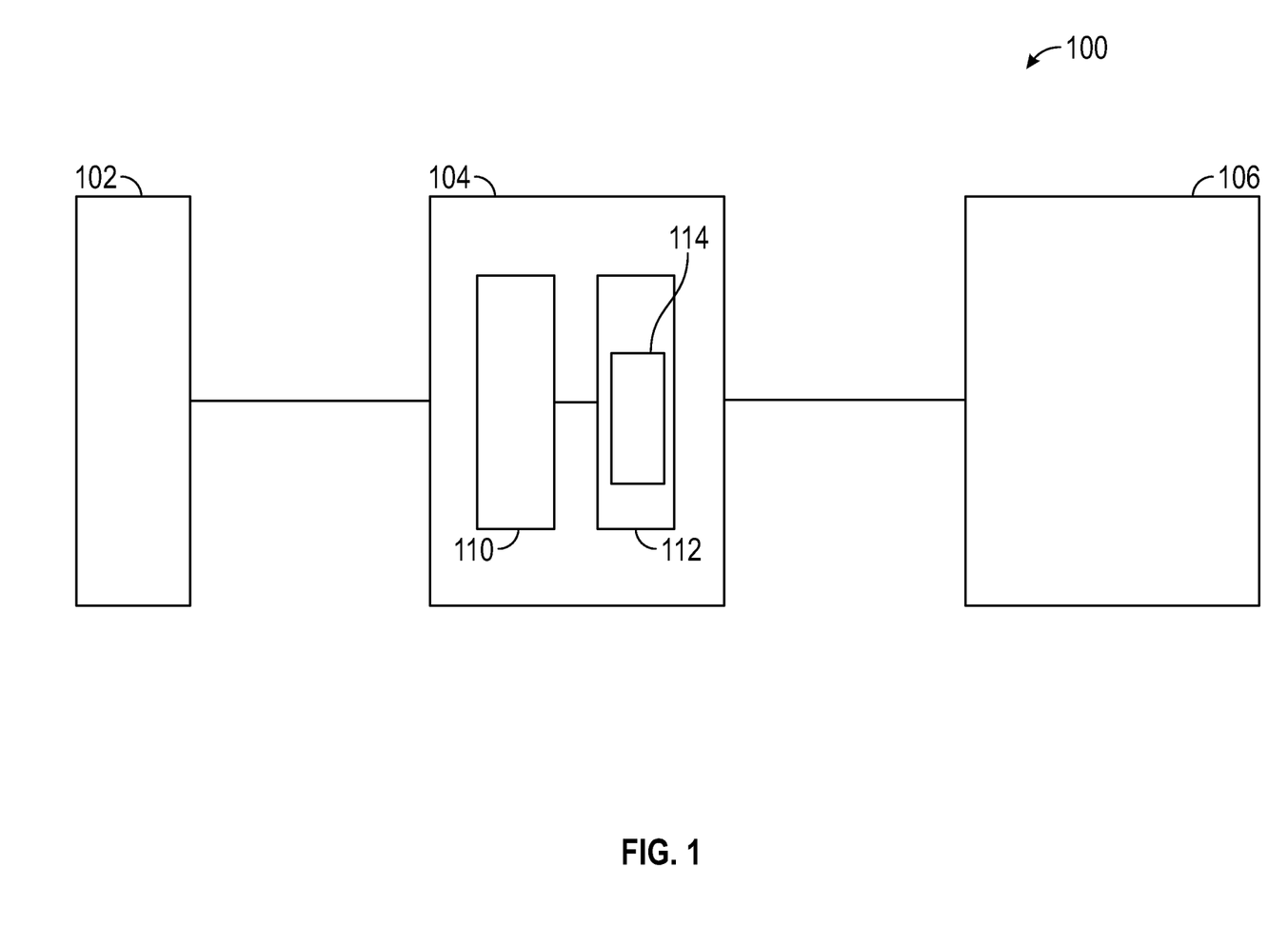
FIG. 1 shows a schematic diagram of a system suitable for fitting glasses to an individual or client.

In accordance with an exemplary embodiment, FIG. 1 shows a schematic diagram of a system 100 suitable for fitting glasses to an individual, person or client. The system 100 includes an imaging device 102, a processing unit 104 and an input/output device 106. In various embodiments, the imaging device 102 can be a camera of a smartphone or handheld device, a Lidar imaging device, a digital camera, a web camera, etc. The imaging device 102 can be in communication with the processing unit 104 either by a wired connection or via a wireless communication channel. The processing unit 104 can include a processor 110 and a storage medium 112, such as a solid-state storage medium. The processor 110 can be a single processor or a plurality of processors, a cloud computer, etc. A set of programs or instructions 114 ("software") can be stored at the storage medium. When accessed by the processor 110, the set of programs or instructions 114 can be used by the processor 110 to execute the various methods disclosed herein. The results of the processing can be communicated from the processor 110 to the display 106. The processing unit 104 can be in communication with the display 106 either by a wired connection or via a wireless communication channel.

In one embodiment, the imaging device 102 of the system 100 includes a camera of a smartphone or handheld communication device. The smartphone can have an interface such as a touchscreen that allows a client to follow instructions for capturing his own image, including positioning himself at a selected distance and orientation with respect to the imaging device, entering relevant data, such as client name, frame name and brand, etc., and sending the image and data to the processing unit 104. The processing unit 104 can be a component of the smartphone that can execute the programs or instructions 114 in the form of an application ("app").

Figure 2:
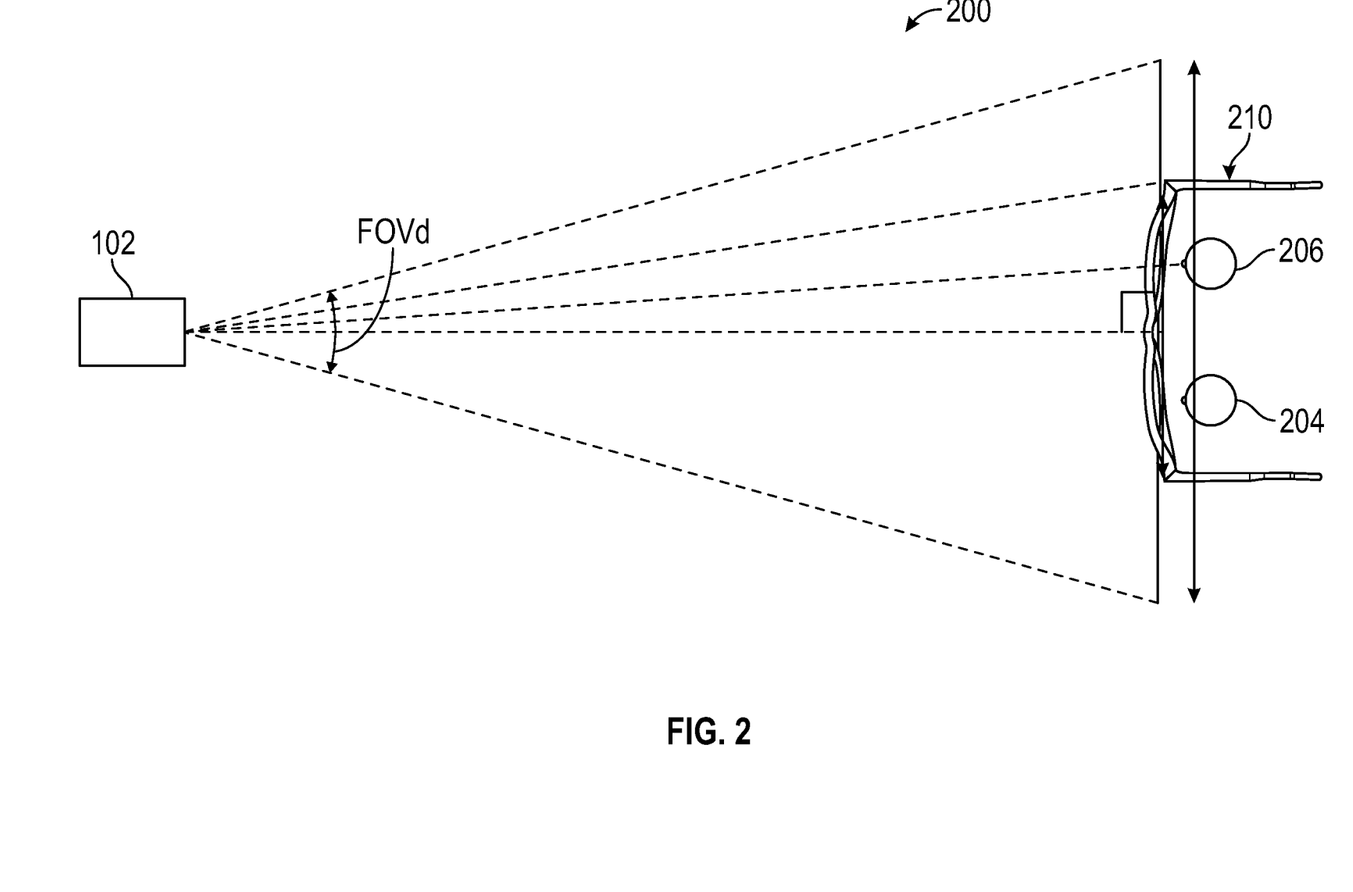
FIG. 2 is a top view of the imaging device and a client, schematically illustrating the client positioned in front of an imaging device.

FIG. 2 is a top view 200 of the imaging device 102 and a client, schematically illustrating the client positioned in front of an imaging device 102. The illustration shows the imaging device 102, left eye 204 and right eye 206 of the client and a frame 210 for glasses. The client selects the frame 210 and wears the frame so that the captured image shows him wearing the selected frame. The selected frame is most likely to be an unfitted frame, meaning that the dimensions of the frame (e.g., a position and shape of the temple bend) do not fit the dimensions of the client or allow the frame to sit properly on the face of the client. A fitted frame, on the other hand, is a frame which has dimensions that fit the dimensions of the client and allow the frame to sit properly on the face of the client. The fitted frame is generally made by adjusting the dimensions of the unfitted frame according to instructions, for example by bending or contorting the frame.

For the configuration shown in FIG. 2, the image that is captured at the imaging device 102 is a head-on view of the client and the unfitted frame 210. By following instructions provided at the handheld device, the client can place himself at a suitable location and orientation with respect to the imaging device 102 (i.e., a distance at which the entirety of the front face of the client and of the unfitted frame is captured within a field of view (FOV) of the imaging device 102). In various embodiments, the client can view a screen with cross hairs on it in order to align his face and frame with the cross hairs when capturing the image. In addition, the client can orient himself with respect to the imaging device 102 to capture images from a plurality of views, including a head-on view, a side-view, etc.

FIG. 2 further shows various field-of-view dimensions related to the imaging device 102 and a distance between the imaging device and the client. The imaging device 102 will have an inherent angular field of view FOVd that can be measured in degrees or radians. The angular field of view FOVd for the imaging device 102 can be known from device specifications and can be stored at the storage medium 112 or in an accessible database. At a selected distance from the imaging device 102, the angular field of view FOVd determines a distance-based field of view FOVmm (or field of view measured in millimeters).

Figure 3:
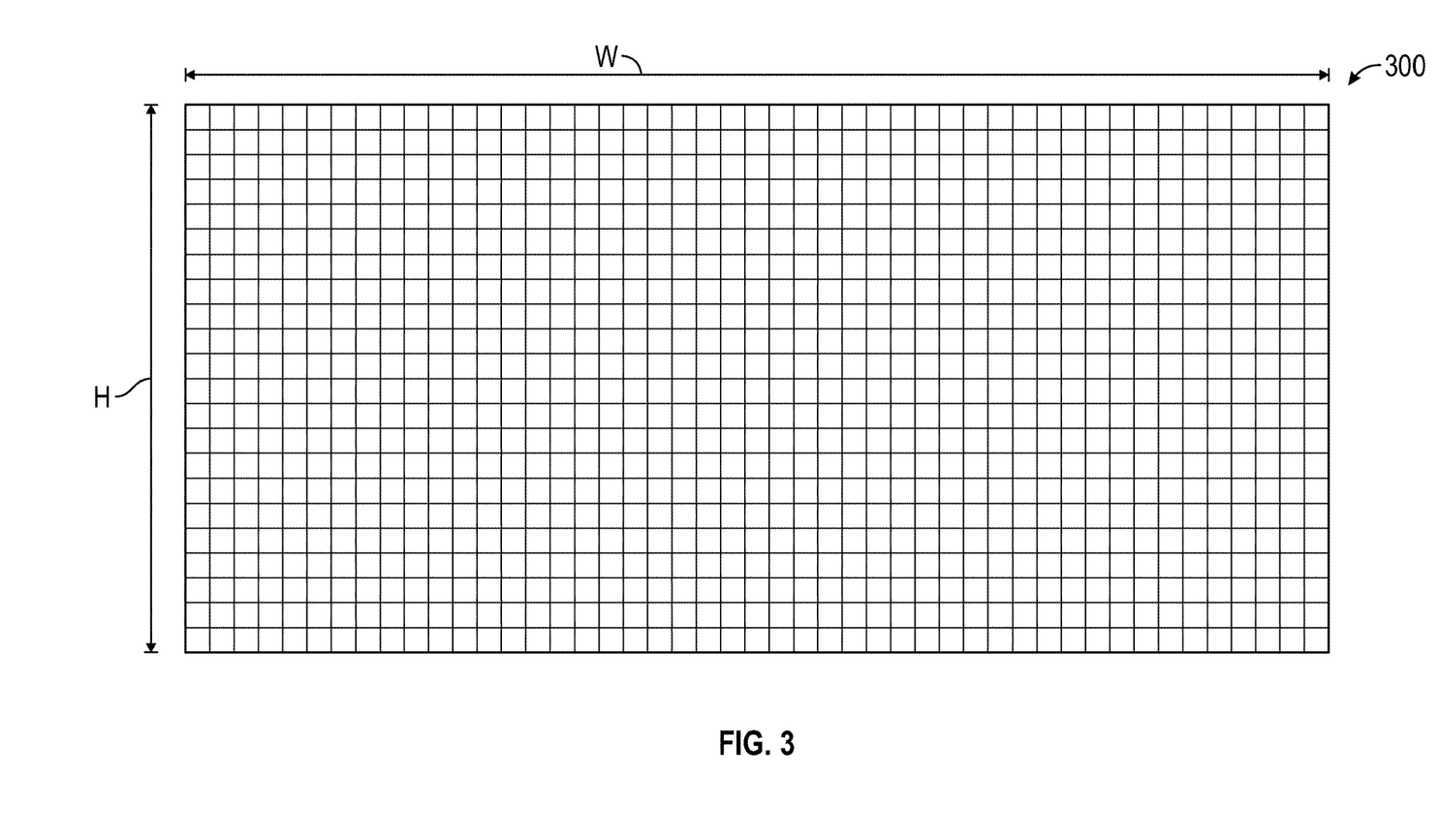
FIG. 3 shows an illustrative pixelated grid that can be used in determining physical dimensions of the unfitted frame and of the client.

FIG. 3 shows an illustrative pixelated grid 300 that can be used in determining physical dimensions of the unfitted frame and of the client. In various embodiments, the imaging device 102 includes a charge coupled device (CCD) that records the image. The CCD includes a plurality of light-sensitive pixels, with each pixel corresponding to a selected angular range of the image. The width (W) and height (H) of the CCD therefore defines the angular field of view FOVd of the imaging device 102. The number of pixels along the horizontal direction (i.e., along width W) defines a pixel-based field of view (FOVp) and is related to the angular field of view in the horizontal direction. Similarly, the number of pixels along the vertical direction (i.e., along height H) is related to the angular field of view in the vertical direction. Distances within the image can be determined using pixels with the pixelated grid and can be converted into physical distances and dimensions using known relations, as discussed below.

Figure 4:
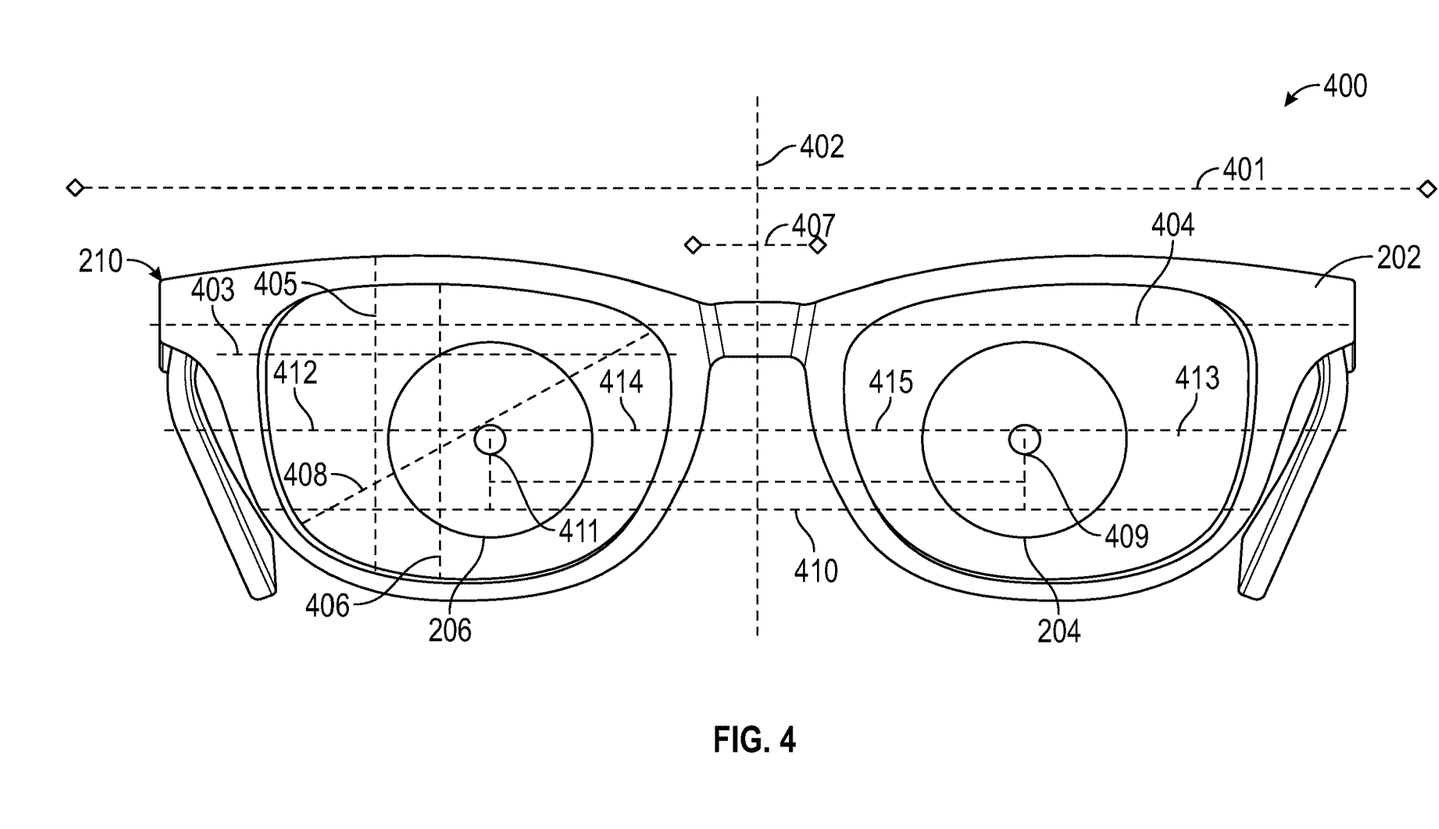
FIG. 4 shows a schematic image from a head on view of the client wearing an unfitted frame.

FIG. 4 shows a schematic image 400 from a head on view of the client wearing an unfitted frame 210. The image 400 shows the rims 202 of the unfitted frame as well as left eye 204 and right eye 206 of the client as well as the field of view (FOVmm) 401. Additionally, the image 400 shows various frame dimensions, client dimensions, lens dimensions and client-frame dimensions. Client-frame dimensions relate a point on the client to a point of the frame. Frame dimensions include frame width 404, frame height 405 and bridge width 407. Client dimensions include right eye pupillary distance (right eye PD 414) and left pupillary distance (left eye PD 415). Right eye PD 414 and left eye PD 415 are measured with respect to the centerline 402 of the rims 202. Lens dimensions include lens size 403, lens height 406 and lens diagonal 408. Since the lenses shown in FIG. 4 are progressive lenses, the lens dimensions can further include left eye segment drop 409, right eye segment drop 411 and segment transition 410. Client-frame dimensions include the left eye pupil distance to the frame width 413 and the right eye pupil distance to the frame width 412.

Figure 5:
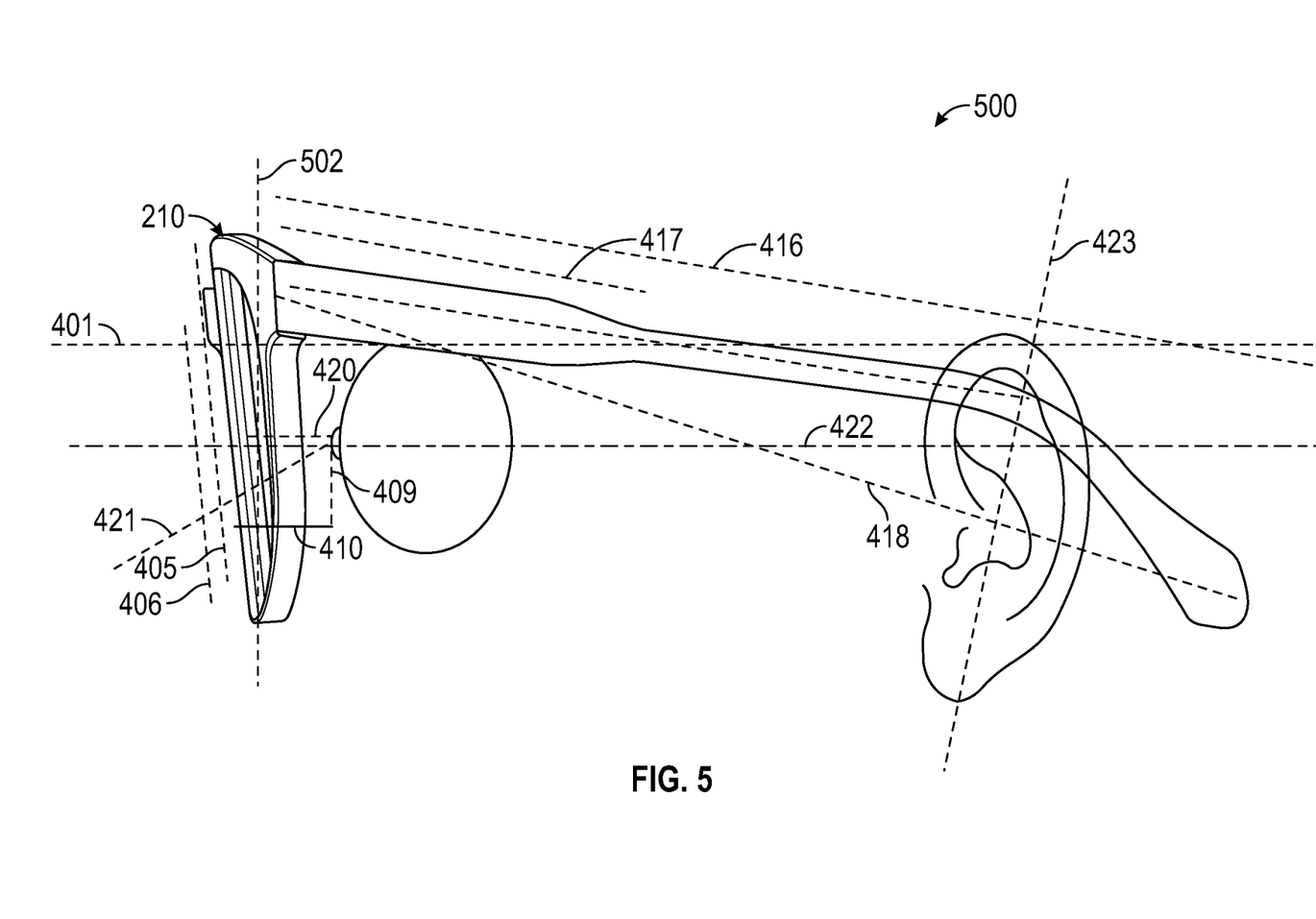
FIG. 5 shows a side view image of the client wearing the unfitted frame.

FIG. 5 shows a side view image 500 of the client wearing the unfitted frame 210. The side view image 500 is taken so that the entirety of the length of the temple of the frame lies within the side-FOV 401 of the imaging device 102. The side view image 500 is of the client's left side and shows a left eye and left ear of the client. Alternatively, or in addition, a side view image can be taken from the client's right side. A lens plane 502 is shown at a location of the lenses. Frame dimensions shown in the side view image 500 include frame height 405, temple length 416, temple detail length 417 and temple length diagonal 418, temple bend 422 and temple bend position 423. Lens dimensions shown in the side view image 500 include lens height 406, segment drop (e.g., left eye segment drop 409) and segment transition 410. Client-frame dimensions include pupil to frame distance 420 and segment transition line of sight 421. The segment transition line of sight 421 can be expressed as an angle of declination from horizontal.

Figure 6:
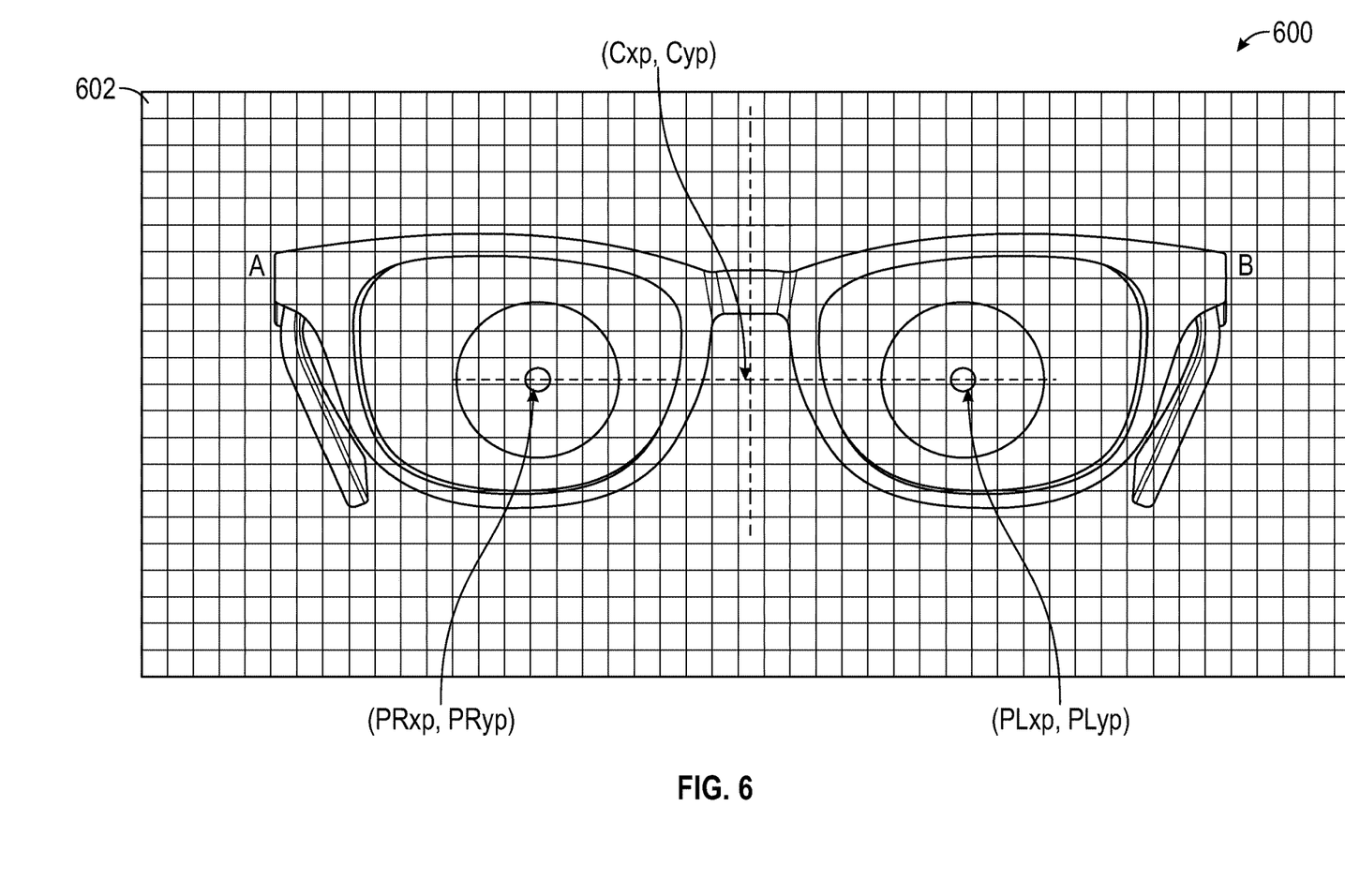
FIG. 6 shows an image of the head on view of FIG. 4 superimposed over the pixelated grid of FIG. 3, in an illustrative embodiment.

FIG. 6 shows an image 600 of the head on view 400 of FIG. 4 superimposed over the pixelated grid 300 of FIG. 3, in an illustrative embodiment. The processor 110 projects the head on view 400 onto the pixelated grid 300 and relevant dimensions are determined in terms of pixels. An origin (0,0) of the grid is located at origin pixel 602 in the top corner of the grid 400 and pixel coordinates are measured with respect to the origin pixel 602. An image processing program can be operated at the processor 110 to determine pixel locations and coordinates of selected points (such as points of the frame and/or of the client) within the grid 400. Pixel distances can then be determined between the selected pixels using the determined coordinates. For example, pixels A and B can be identified to represent the outer edges of the rims. The frame width in pixels (i.e., distance between A and B) can then be calculated.

Additionally, since the client or another operator provides the brand and model of the frame to the processing unit 104, the processor 110 can access the specifications of the frame from a frame database and determine an actual frame width 401 (FWmm) of the unfitted frame. In an alternate embodiment, a ruler or standardized measuring device can be held in front of the frame during the imaging process. The values for FWp and FWmm can then be used to create a conversion factor or conversion ratio (PXmm) between physical dimensions and pixel dimensions, as shown in Eq. (1):

$$PXmm = FWp/FWmm \quad \text{Eq. (1)}$$

Once the conversion ratio has been determined, the other physical distances shown in FIGS. 4 and 5 can be determined from pixel calculations. For example, as shown in FIG. 6 the location of the right pupil is given in pixel coordinates as (PRxp, PRyp) and the location of the left pupil is given by the pixel coordinates as (PLxp, PLyp). The interpupillary distance PD2$d$ (in millimeters) can then be determined using the conversion ratio of Eq. (1), as shown in Eq. (2):

$$PD2d = \sqrt{|PRxp - PLxp|^2 + |PRyp - PLyp|^2}/PXmm \quad \text{Eq. (2)}$$

Additionally, the pixel location of the center position of the frame is given by the pixel coordinates (Cxp, Cyp). Thus, the left pupillary distance 414 of FIG. 4 is given by Eq. (3):

$$PDL2d = \sqrt{|Cxp - PLxp|^2 + |Cyp - PLyp|^2}/PXmm \quad \text{Eq. (3)}$$

and the right pupillary distance 415 of FIG. 4 is given by Eq. (4):

$$PDR2d = \sqrt{|Cxp - PRxp|^2 + |Cyp - PRyp|^2}/PXmm \quad \text{Eq. (4)}$$

The vertical location of the segment transition 410 can then be determined in pixels using Eq. (5):

$$ST = ((PLyp + PRyp)/2) + (LD * PXmm) \quad \text{Eq. (5)}$$

where LD is a lens drop in millimeters, which can be specified by a lens prescription.

Figure 7:
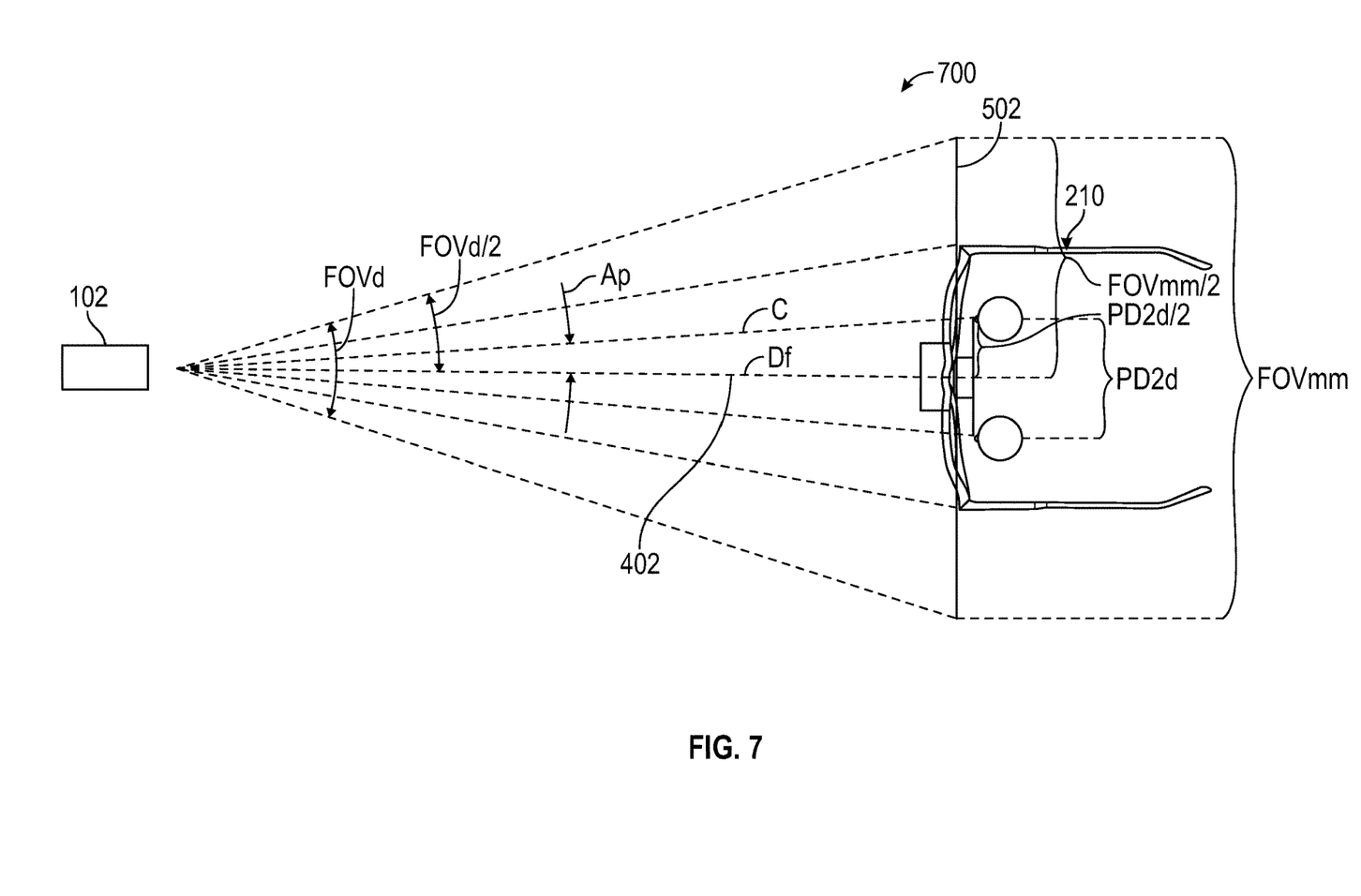
FIG. 7 shows a top view of the frame and imaging system.

FIG. 7 shows a top view of the frame 210 and imaging system 102. A perpendicular distance Df between the imaging system 102 and the unfitted frame 210 or the lens plane 502 is indicated by line 702. The distance-based field of view is indicated by FOVmm, which is known from FOVp and the conversion ratio of Eq. (1). Also shown is half of the field of view (i.e., FOVmm/2) which is measured from one edge of the field of view to the centerline 402. Also shown is the angular field of view and FOVd and the angular extent of half of the field of view (i.e., angle FOVd/2). Since FOVp and FOVd are known quantities, the distance Df between imaging device 102 and frames 210 can be determined using Eq. (6):

$$Df = ((FOVp/2)/PXmm) * \sin((90 - (FOVd/2)) * (\pi/180)) / \sin((FOVd/2) * (\pi/180)) \quad \text{Eq. (6)}$$

where Df is determined in millimeters. Once Df (from Eq. (6)) and interpupillary distance PD2$d$ (from Eq. (2)) have been determined, the distance C measured from imaging device to a pupil of the client (e.g., right eye PD 414) can be determined. The distance C is a hypotenuse of a right triangle including sides of length Df and PD2$d$/2, as shown in Eq. (7):

$$C = \sqrt{\left(\frac{PD2d}{2}\right)^2 + Df^2} \quad \text{Eq. (7)}$$

Given C, Df and PD2$d$, the angle of extent Ap subtended by either the right pupillary distance 414 or the left pupillary distance 415 is given by Eq. (8).

$$Ap = \cos^{-1}\left(C^2 + Df^2 - \left(\frac{PD2d}{2}\right)^2\right) / (2 * C * Df)) \quad \text{Eq. (8)}$$

Figure 8:
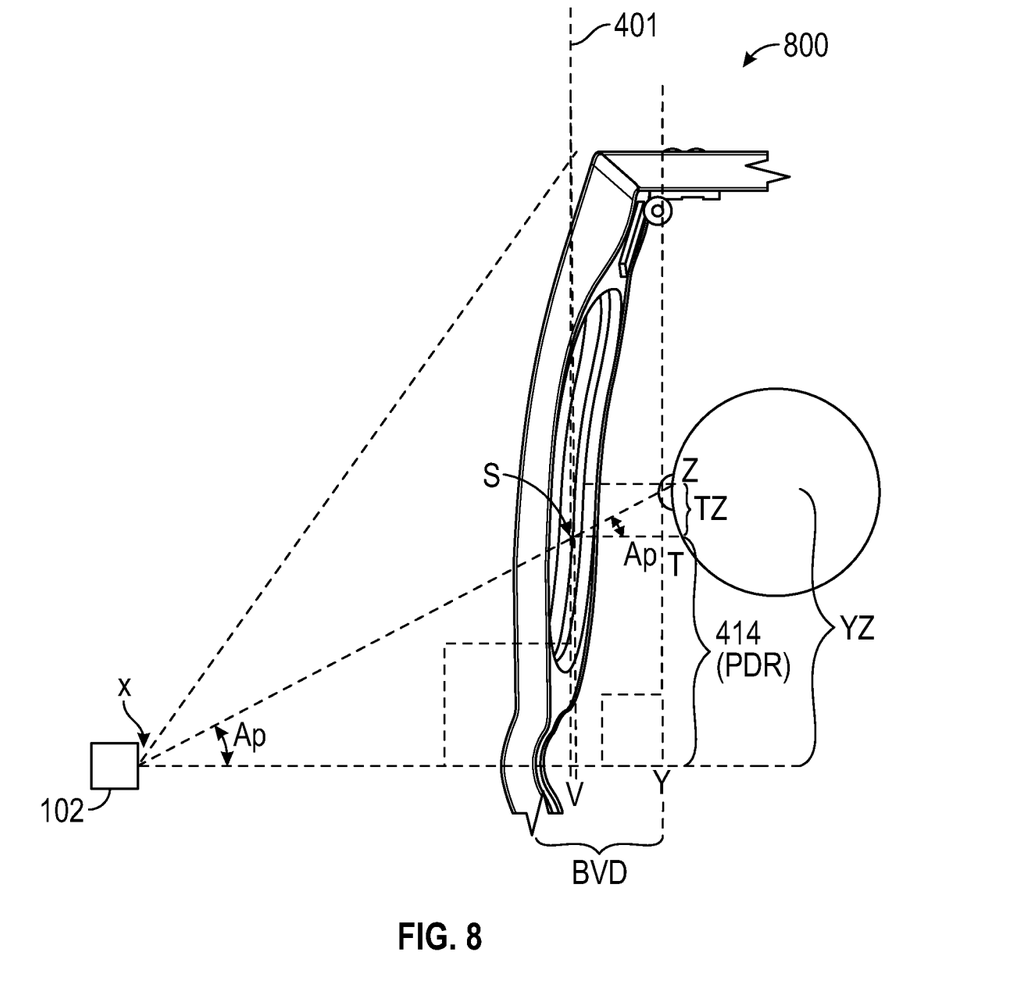
FIG. 8 illustrates a correction that can be made to account for a difference between the location of the frame and the distance of the client's eyes with respect to the imaging device.

FIG. 8 illustrates a correction 800 that can be made to account for a distance between the location of the frame and the distance of the client's eyes with respect to the imaging device 102. This distance is shown as back vertex distance, which is indicated by BVD in FIG. 8. This back vertex distance can be determined from the side view 500 shown in FIG. 5. For illustrative purposes, the imaging device 102 is shown at a relatively close distance in order to exaggerate the error produced by not considering the vertex distance BVD in interpupillary calculations.

Based on the location of the field of view line 401, the pupil is determined to be at position S and the right eye PD 414 is given by length VS. However, the pupils are not at the location of the field of view line 401 but instead at a further distance away from the imaging device 102 by an additional back vertex distance BVD. The actual location of the pupil is therefore at Z, and the right eye PD 414 should be the length YZ. The correct interpupil distance can therefore be determined using the back vertex distance BVD as shown in Eq. (9):

$$PD = \sqrt{|PRxp - PLxp|^2 + |PRyp - PLyp|^2} + \left(2 * BVDp * \frac{\sin(Ap * (\pi/180))}{\sin(90 - Ap * (\pi/180))}\right) * \left(\frac{1}{Pxmm}\right) \quad \text{Eq. (9)}$$

The correct left eye PD 415 is therefore given by Eq. (10):

$$PDL = \sqrt{|Cxp - PLxp|^2 + |Cyp - PLyp|^2} + \left(BVDp * \frac{\sin(Ap * (\pi/180))}{\sin(90 - Ap * (\pi/180))}\right) * \left(\frac{1}{Pxmm}\right) \quad \text{Eq. (10)}$$

and the correct right eye PD 414 is given by Eq. (11):

$$PDR = \sqrt{|Cxp - PRxp|^2 + |Cyp - PRyp|^2} + \left(BVDp * \frac{\sin(Ap * (\pi/180))}{\sin(90 - Ap * (\pi/180))}\right) * \left(\frac{1}{Pxmm}\right) \quad \text{Eq. (11)}$$

where $$BVDmm = BVDp/PXmm \quad \text{Eq. (12)}$$

and $$BVDp = BVDmm * PXmm \quad \text{Eq. (13)}$$

Once, the correct dimensions of Eqs. (9)-(11) have been determined, the technician adjusts the dimensions of the unfitted frame to form a fitted frame that fits the client based on the output.

As metadata concerning the frames (such as frame brand and model) and lenses is supplied to the technician, the technician can locate the frames within a database and retrieve a pair on his own without the client needing to send frames to the technician. A fitted frame can be found by locating the brand in a more appropriate size. Most likely, the dimensions of the unfitted frame, such as the temple bend, the temple bend position, etc. are adjusted to form the fitted frame. The technician takes into account various lens dimensions in order to form fitted frames that place the lens at a selected location with respect to the client's eyes or pupils, as well as place progressive lenses at appropriate locations for the client.

Figure 9:
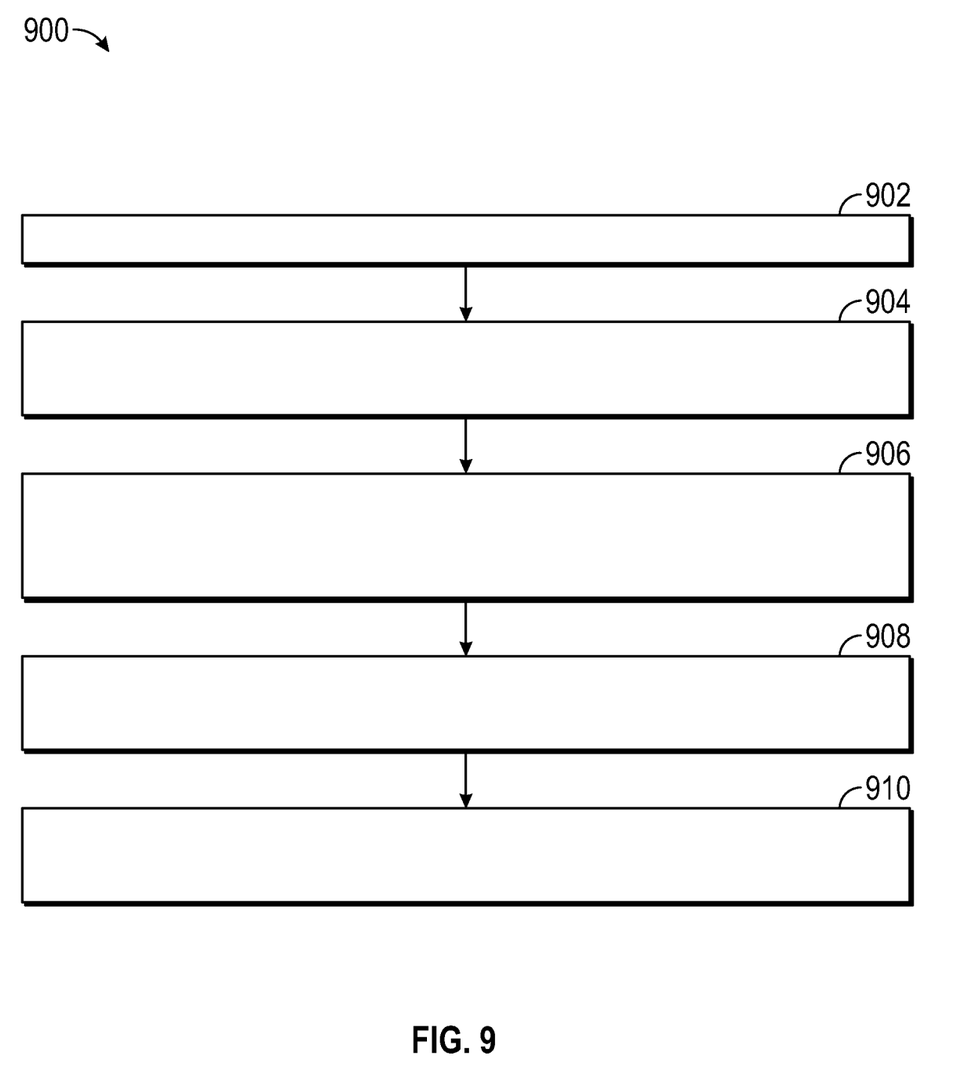
FIG. 9 shows a flowchart for fitting unfitted frames to a client using the methods disclosed herein.

FIG. 9 shows a flowchart 900 for fitting unfitted frames to a client using the methods disclosed herein. In box 902, an image is captured of the client wearing an unfitted glasses frame on a pixelated grid. In box 904, a conversion factor between pixel distances within the pixelated grid and physical distances is determined. In box 906, a dimension of the client, such as an interpupillary distance is determined from the images. In box 908, a dimension of a fitted frame is determined that provides a correct lens-pupil dimension for the lens based on the head dimensions and the specifications of the lens. In box 910, the dimensions of the unfitted frame are adjusted in order to produce a fitted frame.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of fitting glasses to a client, comprising:
   obtaining a head-on image of the client while wearing a frame and a side view image of the client while wearing the frame using an imaging device at a first location, wherein the frame has a first dimension that does not fit the client;
   entering a model of the frame into the imaging device via an interface;
   obtaining the first dimension of the frame from a database using the model of the first frame;
   determining a dimension of the client from the head-on image, the side view image, and the first dimension of the frame;
   determining a second dimension for the frame that fits the client and that provides a selected lens-pupil distance for a lens based on the dimension of the client and a specification of the lens;
   obtaining a copy of the frame at a second location, the copy of the frame having the first dimension; and
   providing an instruction to a person at the second location to bend the copy of the frame to the second dimension, wherein determining the dimension of the client includes determining an interpupillary distance of the client from the head-on image, determining one of a right pupillary distance or a left pupillary distance from the interpupillary distance, determining an angle of extent subtended by the one of the right pupillary distance and the left pupillary distance, determining a back vertex distance between the frame and an eye of the client from the side view image, determining a correction to the interpupillary distance from the back vertex distance and the angle of extent and determining a corrected interpupillary distance from the interpupillary distance and the correction.

2. The method of claim 1, wherein the imaging device further comprises one of: (i) a hand-held device; (ii) a smartphone; (iii) a Lidar imaging device; (iv) a digital camera; and (v) a web camera.

3. The method of claim 1, further comprising mapping the image to a pixelated grid and determining the first dimension at the pixelated grid.

4. The method of claim 1, further comprising determining a conversion factor between a pixel dimension of a pixelated grid and a physical dimension of the frame using a frame width in pixel dimensions and a known frame width of the frame.

5. The method of claim 1, further comprising determining an interpupillary distance of the client using a back vertex distance.

6. The method of claim 1, wherein the side view image includes a right side view image and a left side view image.

7. The method of claim 1, further comprising bending the frame to the second dimension to obtain at least one of (i) a selected interpupillary distance of a left lens and a right lens; (ii) a selected back vertex distance; and (iii) a location of a seg drop.

8. The method of claim 1, wherein bending the frame to the second dimension further comprises adjusting at least one of: (i) a temple bend; and (ii) a temple bend position.

9. The method of claim 1, further comprising determining a distance from the imaging device and the frame from a known angular extent of the imaging device and determining the angle of extent from the distance from the imaging device and the frame and the interpupillary distance.

10. A system for fitting glasses to a client, comprising:
    an imaging device for obtaining a head-on image and a side view image of the client at a first location while wearing a frame having a first dimension, wherein the first dimension of the frame does not fit the client;
    an interface associated with the imaging device for entering a model of the first frame;
    a processor configured to:
      obtain the first dimension of the frame from a database using the model of the frame;
      determine a dimension of the client from the head-on image, the side view image, and the first dimension of the frame, wherein determining the dimension of the client includes determining an interpupillary distance of the client from the head-on image, determining one of a right pupillary distance or a left pupillary distance from the interpupillary distance, determining an angle of extent subtended by the one of the right pupillary distance and the left pupillary distance, determining a back vertex distance between the frame and an eye of the client from the side view image, determining a correction to the interpupillary distance from the back vertex distance and the angle of extent and determining a corrected interpupillary distance from the interpupillary distance and the correction; and
      determine a second dimension for the frame that fits the client and that provides a selected lens-pupil distance for a lens based on the dimension of the client and a specification of the lens; and
      provide an instruction to a person at a second location for bending the frame to the second dimension, wherein the person obtains a copy of the frame and bends the copy of the frame to the second dimension.

11. The system of claim 10, wherein the imaging device further comprising one of: (i) a hand-held device; (ii) a smartphone; (iii) a Lidar imaging device; (iv) a digital camera; and (v) a web camera.

12. The system of claim 10, wherein the processor is further configured to map the image to a pixelated grid and determine the first dimension at the pixelated grid.

13. The system of claim 10, wherein the processor is further configured to determine a conversion factor between a pixel dimensions of a pixelated grid and a physical dimension of the frame using a frame width in pixel dimensions and a known frame width of the frame.

14. The system of claim 10, wherein the processor is further configured to determine an interpupillary distance of the client using a back vertex distance.

15. The system of claim 10, wherein the side view image includes a right side view image and a left side view image.

16. The system of claim 10, wherein the frame is bent to the second dimension to obtain at least one of (i) a selected interpupillary distance of a left lens and a right lens; (ii) a selected back vertex distance; and (iii) a location of a seg drop.

17. The system of claim 10, wherein the frame is bent to the second dimension to adjust at least one of: (i) a temple bend; and (ii) a temple bend position.

* * * * *